Figure 1:
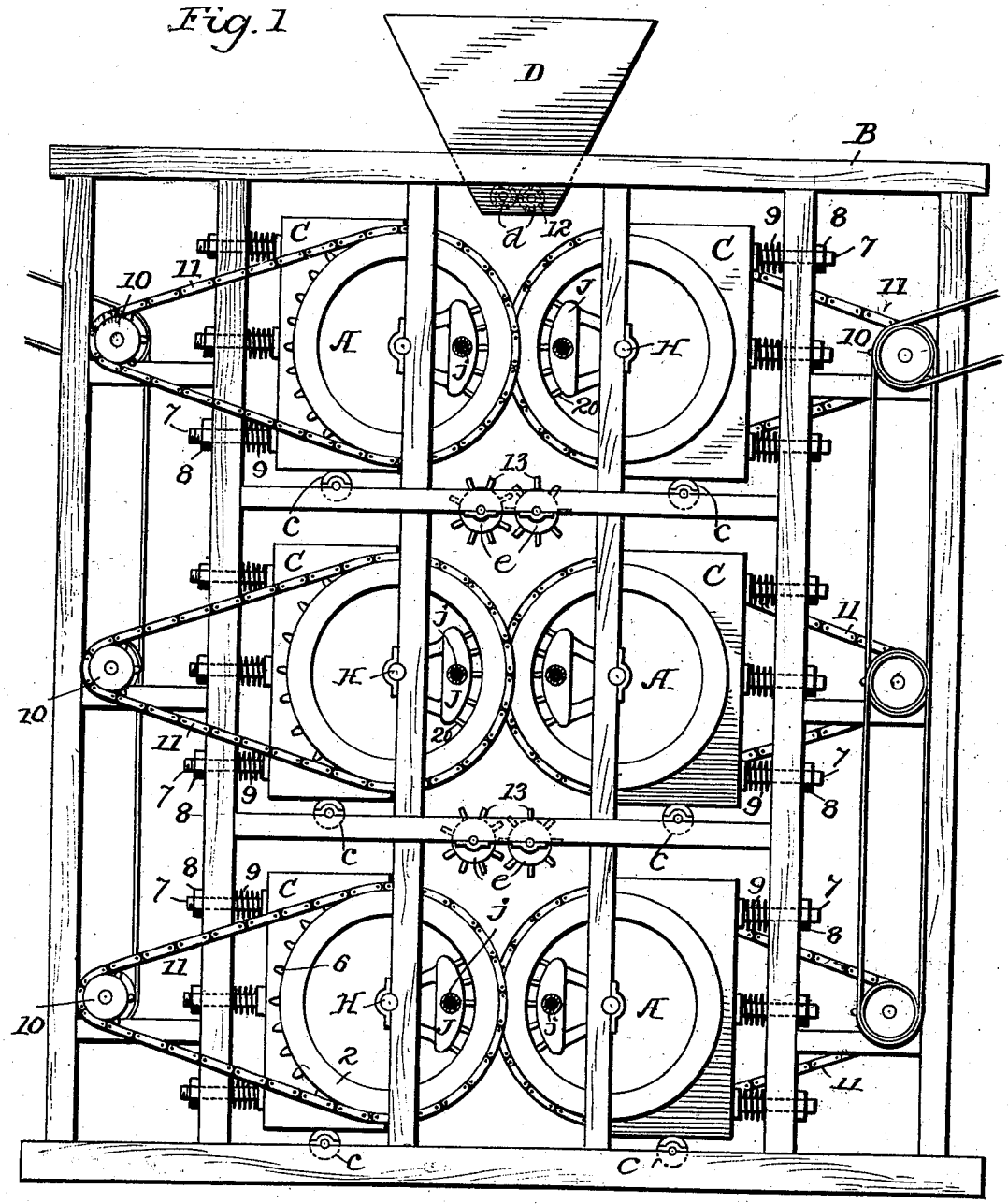

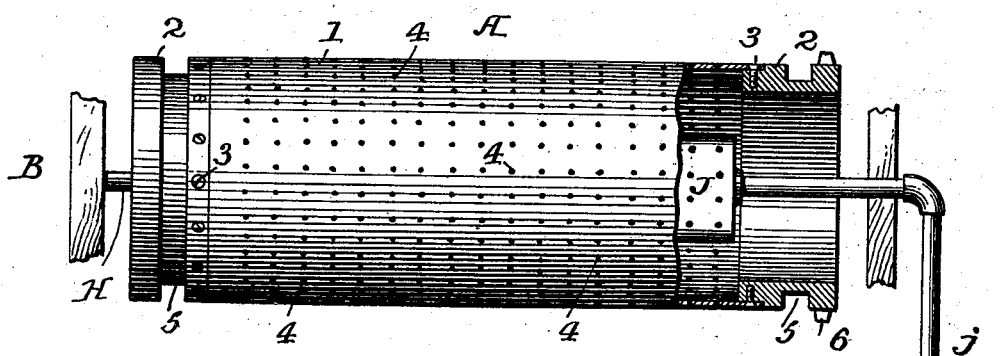
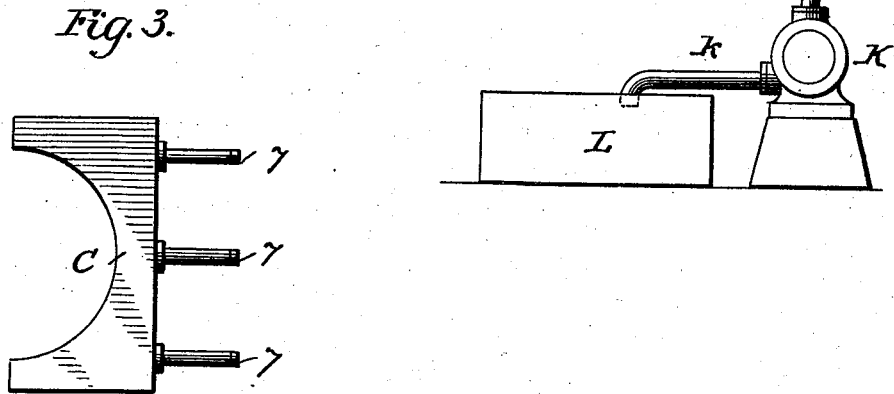
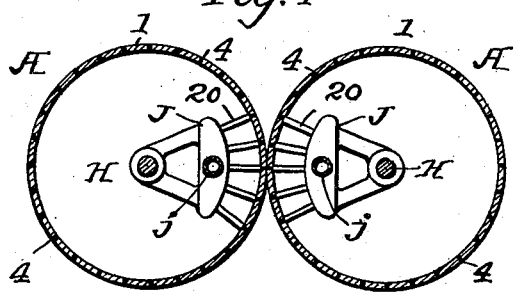

UNITED STATES PATENT OFFICE.

JOHN CHARLES WILLIAM STANLEY, OF LONDON, ENGLAND.

APPARATUS FOR EXPRESSING MOISTURE FROM BREWERS' GRAIN, &c.

SPECIFICATION forming part of Letters Patent No. 695,585, dated March 18, 1902.

Application filed July 1, 1901. Serial No. 66,733. (No model.)

*To all whom it may concern:*

Be it known that I, JOHN CHARLES WILLIAM STANLEY, a subject of the King of Great Britain, residing at London, England, have invented certain new and useful Improvements in Apparatus for Expressing Moisture from Cooked Fish or Meat, Brewers' Grain, &c., of which the following is a specification.

This invention relates to apparatus for expressing moisture from cooked fish or meat, brewers' grains &c.; and the object is to provide an improved apparatus for this purpose by means of which the operation of expressing the moisture may be carried on continuously without having to stop the mechanism to charge the apparatus with the moist material and to remove it after the moisture has been expressed.

The invention will be fully described hereinafter, reference being had to the accompanying drawings, in which—

Figure 1 is an end elevation of an apparatus embodying my invention. Fig. 2 is a longitudinal section of one of the expressing-cylinders. Fig. 3 is a side view of one of the brackets which support the expressing-cylinders. Fig. 4 is a view of the apparatus preferably employed to collect the expressed moisture.

The expressing-cylinders A are substantial duplicates, and, as shown, each consists of the expressing cylindrical portion 1, provided at each end with a tubular head 2, of heavier metal, such heads being secured to the cylinder in any approved manner—as, for instance, by screws or rivets, as indicated at 3. The cylinder is provided with rows of perforations 4, through which the moisture from the material being treated will pass to the interior of the cylinder. Each head is provided with an exterior circumferential groove 5 and with sprocket-teeth 6.

There will be a suitable frame (indicated as a whole by B) to support the working parts of the apparatus, and in order to support the cylinders so they can revolve I preferably employ a series of brackets C of a thickness to fit in the grooves 5 of the cylinder-heads. The bracket is semicircular in form on its inner edge to fit the groove 5 and form a steady support for the cylinder. From the rear edge of the bracket a series of pins 7 project, which are threaded at their outer ends to receive nuts 8. These pins extend loosely through openings in a vertical post forming part of the frame B, and between such post and the rear edge of the bracket I provide springs 9, and the nuts 8 will be screwed up against the post, and when the parts are assembled it is obvious the springs will normally tend to press the cylinders of each pair toward each other, but will permit them to yield for the passage between them of the material being treated. Preferably there will be two or more pairs of expressing-cylinders arranged one below another; but I do not limit myself in this respect, as sometimes a single pair of cylinders may be sufficient. The brackets will be supported by rollers $c$, journaled in the frame B.

The cylinders will be driven in opposite directions, preferably by means of a series of sprocket-wheels 10 and sprocket-chains 11, as indicated in Fig. 1, and this driving mechanism needs no special description and may be superseded by other driving mechanisms, if desired. Preferably the cylinders of each pair will be driven at different speeds in order to effect a rubbing action by the cylinders on the material being treated.

There will be a feed-hopper D to deliver the material to the upper pair of cylinders, and in the bottom of the hopper there will preferably be a pair of feed-rolls $d\,d$, provided with pins 12 on their peripheries, which will serve to deliver the material to the cylinders in a loose or broken-up condition. When more than one pair of cylinders are employed, there will also be a pair of rolls $e\,e$, having pins 13 on their peripheries, between the successive pairs of cylinders, in order to break up the material as it passes from one pair of cylinders to the next pair. The rolls $d\,d$ and $e\,e$ may be rotated by any suitable mechanism not necessary to illustrate or describe.

Some means must be employed to collect the moisture that is expressed and which, as before stated, will pass to the inner surfaces of the expressing-cylinders, and while this may be accomplished in various ways I preferably employ a suction device which will collect the moisture and deliver it to a storage-receptacle. A shaft or bar H extends through the cylinder and is supported rigidly in position on the frame B. Supported by this shaft is a casing J, of vulcanite or iron, running the length of the cylinder and adjacent to the expressing area. From one end of the casing J a pipe j will extend to a vacuum-pump K, and another pipe k will lead from the pump to a tank L. A series of small tubes 20, radiating from and supported by the casing J and communicating therewith, will at their outer ends just touch the inner surface of the cylinder, and it is obvious that when the pump K is working suction will be caused at the outer ends of the tubes 20 and the moisture passed through the perforations of the cylinder will be sucked through the tubes 20 into the casing J and the liquor collected therein will be pumped to the tank L.

The operation is as follows: The material to be treated is fed into the hopper D, whence it is delivered in a loose or broken-up or divided condition by the rolls $d\ d$ to the upper expressing-cylinders, and in passing between these cylinders the moisture will pass through the perforations 4 to the inner surface of each cylinder and be sucked into the casing J, from which it will be pumped to the tank L. As the material passes from between the first pair of cylinders it will fall upon the rolls $e\ e$, which will again break or loosen it up and feed it to the next pair of cylinders, where more moisture will be expressed and collected, and so on through as many pairs of cylinders as may be necessary. By repeatedly loosening or breaking up the material by successive rolls $d\ d$ and $e\ e$ all parts of the material will be presented to and acted on by the cylinders, and thus all or nearly all the moisture will be expressed.

Without limiting myself to the precise details of construction illustrated and described, I claim—

1. The combination with a pair of perforated expressing-cylinders supported side by side, and means to rotate them in opposite directions, of a feed-hopper supported above the cylinders, breaking-rolls in the bottom of the hopper, a casing supported within each cylinder, pipes radiating from the casings and engaging with their outer ends the interior surfaces of the respective cylinders, and means to create suction within the casings and pipes, substantially as set forth.

2. The combination of a perforated expressing-cylinder, a casing supported within it, a series of tubes radiating from and communicating with the interior of the casing and engaging with their outer ends the inner surface of the cylinder, and means to create suction within the casing and tubes, substantially as and for the purpose specified.

3. The combination of a perforated expressing-cylinder, a casing supported within it, a series of tubes radiating from and communicating with the interior of the casing and engaging with their outer ends the inner surface of the cylinder, a pump connected to said casing, a tank, and a pipe leading from the pump to the tank, substantially as set forth.

4. In an apparatus for expressing moisture from cooked fish, &c., the combination of a series of pairs of perforated expressing-cylinders arranged one above the other, a feed-hopper, breaking-rolls in the bottom of the hopper, breaking-rolls between successive pairs of cylinders, means to rotate the cylinders, and a suction device within each cylinder to collect the moisture forced through its perforation to its inner surface, substantially as set forth.

In testimony whereof I have signed my name to this specification in the presence of two subscribing witnesses.

JOHN CHARLES WILLIAM STANLEY.

Witnesses:
JAMES F. O'BEIRNE,
WILLIAM A. PERRY, Jr.